United States Patent
Hargreaves et al.

(10) Patent No.: US 10,095,948 B2
(45) Date of Patent: Oct. 9, 2018

(54) MODULATION SCHEME FOR FINGERPRINT SENSING

(71) Applicant: SYNAPTICS INCORPORATED, San Jose, CA (US)

(72) Inventors: Kirk Hargreaves, Mountain View, CA (US); Patrick Smith, San Jose, CA (US); Joseph Kurth Reynolds, Alviso, CA (US); Stephen L. Morein, San Jose, CA (US)

(73) Assignee: SYNAPTICS INCORPORATED, San Jose, CA (US)

(*) Notice: Subject to any disclaimer, the term of this patent is extended or adjusted under 35 U.S.C. 154(b) by 291 days.

(21) Appl. No.: 14/788,390

(22) Filed: Jun. 30, 2015

(65) Prior Publication Data
US 2017/0006223 A1    Jan. 5, 2017

(51) Int. Cl.
*H04N 5/232*    (2006.01)
*H04N 5/225*    (2006.01)
(Continued)

(52) U.S. Cl.
CPC ........... *G06K 9/38* (2013.01); *G06K 9/00067* (2013.01)

(58) Field of Classification Search
CPC .................. H04N 5/23241; H04N 5/2253
See application file for complete search history.

(56) References Cited

U.S. PATENT DOCUMENTS 4,008,427 A    2/1977    Johnson 4,087,625 A    5/1978    Dym et al.
(Continued)

FOREIGN PATENT DOCUMENTS

CN    2436978 Y    6/2001
CN    1490713 A    4/2004
(Continued)

OTHER PUBLICATIONS

International Search Report, PCT/US2013/021314 dated Jun. 25, 2013.
(Continued)

*Primary Examiner* — Anand S Rao
*Assistant Examiner* — Tyler B Edwards
(74) *Attorney, Agent, or Firm* — Patterson + Sheridan, LLP (57) ABSTRACT

This disclosure generally provides a fingerprint sensor that derives a fingerprint by measuring capacitive sensing signals while modulating a reference voltage rail used to power the fingerprint sensor. In one embodiment, the fingerprint sensor is integrated into an electronic device which may include other components such as a display, I/O devices, speakers, and the like. To power these components, the electronic device may include a DC power supply which outputs reference voltages. When transmitting the reference voltages to the fingerprint sensor, the electronic device may modulate the voltages using a modulating signal. Because the reference voltages are used to power the components in the fingerprint sensor, modulating the rail voltages also causes the components coupled to the reference voltages to also modulate. While this modulation occurs, the fingerprint sensor measures resulting signals using a plurality of sensor electrodes which are then processed to derive a fingerprint.

21 Claims, 5 Drawing Sheets

(51) Int. Cl.
  *G06K 9/00* (2006.01)
  *G06K 9/38* (2006.01)

(56) References Cited

U.S. PATENT DOCUMENTS

| | | |
|---|---|---|
| 4,233,522 A | 11/1980 | Grummer et al. |
| 4,237,421 A | 12/1980 | Waldron |
| 4,264,903 A | 4/1981 | Bigelow |
| 4,293,987 A | 10/1981 | Gottbreht et al. |
| 4,484,026 A | 11/1984 | Thornburg |
| 4,492,958 A | 1/1985 | Minami |
| 4,550,221 A | 10/1985 | Mabusth |
| 4,550,310 A | 10/1985 | Yamaguchi et al. |
| 4,659,874 A | 4/1987 | Landmeier |
| 4,667,259 A | 5/1987 | Uchida et al. |
| 4,677,259 A | 6/1987 | Abe |
| 4,705,919 A | 11/1987 | Dhawan |
| 4,771,138 A | 9/1988 | Dhawan |
| 4,878,013 A | 10/1989 | Andermo |
| 4,954,823 A | 9/1990 | Binstead |
| 4,999,462 A | 3/1991 | Purcell |
| 5,053,715 A | 10/1991 | Andermo |
| 5,062,916 A | 11/1991 | Aufderheide et al. |
| 5,239,307 A | 8/1993 | Andermo |
| 5,341,233 A | 8/1994 | Tomoike et al. |
| 5,459,463 A | 10/1995 | Gruaz et al. |
| 5,463,388 A | 10/1995 | Boie et al. |
| 5,650,597 A | 7/1997 | Redmayne |
| 5,657,012 A | 8/1997 | Tait |
| 5,777,596 A | 7/1998 | Herbert |
| 5,841,078 A | 11/1998 | Miller et al. |
| 5,869,790 A | 2/1999 | Shigetaka et al. |
| 6,054,979 A | 4/2000 | Sellers |
| 6,188,391 B1 | 2/2001 | Seely et al. |
| 6,222,522 B1 | 4/2001 | Mathews et al. |
| 6,256,022 B1 | 7/2001 | Manaresi et al. |
| 6,281,888 B1 | 8/2001 | Hoffman et al. |
| 6,288,707 B1 | 9/2001 | Philipp |
| 6,297,811 B1 | 10/2001 | Kent et al. |
| 6,307,751 B1 | 10/2001 | Bodony et al. |
| 6,320,394 B1 | 11/2001 | Tartagni |
| 6,362,633 B1 | 3/2002 | Tartagni |
| 6,380,930 B1 | 4/2002 | Van Ruymbeke |
| 6,452,514 B1 | 9/2002 | Philipp |
| 6,459,044 B2 | 10/2002 | Watanabe et al. |
| 6,486,862 B1 | 11/2002 | Jacobsen et al. |
| 6,512,381 B2 | 1/2003 | Kramer |
| 6,535,200 B2 | 3/2003 | Philipp |
| 6,583,632 B2 | 6/2003 | Von Basse et al. |
| 6,653,736 B2 | 11/2003 | Kishimoto et al. |
| 6,731,120 B2 | 5/2004 | Tartagni |
| 6,771,327 B2 | 8/2004 | Sekiguchi |
| 6,825,833 B2 | 11/2004 | Mulligan et al. |
| 6,879,930 B2 | 4/2005 | Sinclair et al. |
| 6,910,634 B1 | 6/2005 | Inose et al. |
| 6,937,031 B2 | 8/2005 | Yoshioka et al. |
| 6,998,855 B2 | 2/2006 | Tartagni |
| 7,129,935 B2 | 10/2006 | Mackey |
| 7,158,125 B2 | 1/2007 | Sinclair et al. |
| 7,218,314 B2 | 5/2007 | Itoh |
| 7,306,144 B2 | 12/2007 | Moore |
| 7,327,352 B2 | 2/2008 | Keefer et al. |
| 7,339,579 B2 | 3/2008 | Richter et al. |
| 7,348,967 B2 | 3/2008 | Zadesky et al. |
| 7,382,139 B2 | 6/2008 | Mackey |
| 7,388,571 B2 | 6/2008 | Lowles et al. |
| 7,423,219 B2 | 9/2008 | Kawaguchi et al. |
| 7,423,635 B2 | 9/2008 | Taylor et al. |
| 7,439,962 B2 | 10/2008 | Reynolds et al. |
| 7,455,529 B2 | 11/2008 | Fujii et al. |
| 7,522,230 B2 | 4/2009 | Lee |
| 7,548,073 B2 | 6/2009 | Mackey et al. |
| 7,554,531 B2 | 6/2009 | Baker et al. |
| 7,589,713 B2 | 9/2009 | Sato |
| 7,663,607 B2 | 2/2010 | Hotelling et al. |
| 7,724,243 B2 | 5/2010 | Geaghan |
| 7,768,273 B1 | 8/2010 | Kalnitsky et al. |
| 7,786,981 B2 | 8/2010 | Proctor |
| 7,808,255 B2 | 10/2010 | Hristov et al. |
| 7,812,825 B2 | 10/2010 | Sinclair et al. |
| 7,821,274 B2 | 10/2010 | Philipp et al. |
| 7,821,502 B2 | 10/2010 | Hristov |
| 7,859,521 B2 | 12/2010 | Hotelling et al. |
| 7,864,160 B2 | 1/2011 | Geaghan et al. |
| 7,876,309 B2 | 1/2011 | XiaoPing |
| 7,973,771 B2 | 7/2011 | Geaghan |
| 7,977,953 B2 | 7/2011 | Lee |
| 7,986,152 B2 | 7/2011 | Philipp et al. |
| 8,040,326 B2 | 10/2011 | Hotelling et al. |
| 8,059,015 B2 | 11/2011 | Hua et al. |
| 8,125,463 B2 | 2/2012 | Hotelling et al. |
| 8,243,027 B2 | 8/2012 | Hotelling et al. |
| 8,258,986 B2 | 9/2012 | Makovetskyy |
| 8,259,078 B2 | 9/2012 | Hotelling et al. |
| 8,278,571 B2 | 10/2012 | Orsley |
| 8,305,359 B2 | 11/2012 | Bolender et al. |
| 8,319,747 B2 | 11/2012 | Hotelling et al. |
| 9,151,792 B1* | 10/2015 | Kremin .............. G01R 27/2605 |
| 2001/0006999 A1 | 7/2001 | Konno et al. |
| 2002/0077313 A1 | 6/2002 | Clayman |
| 2003/0052867 A1 | 3/2003 | Shigetaka et al. |
| 2003/0099380 A1* | 5/2003 | Gozzini .............. G06K 9/0002 382/124 |
| 2003/0103043 A1 | 6/2003 | Mulligan et al. |
| 2003/0126448 A1* | 7/2003 | Russo ................ G06K 9/00026 713/186 |
| 2003/0234771 A1 | 12/2003 | Mulligan et al. |
| 2004/0062012 A1 | 4/2004 | Murohara |
| 2004/0077313 A1 | 4/2004 | Oba et al. |
| 2004/0125087 A1 | 7/2004 | Taylor et al. |
| 2004/0222974 A1 | 11/2004 | Hong et al. |
| 2004/0239650 A1 | 12/2004 | Mackey |
| 2004/0252109 A1 | 12/2004 | Trent et al. |
| 2005/0030048 A1 | 2/2005 | Bolender et al. |
| 2006/0038754 A1 | 2/2006 | Kim |
| 2006/0097991 A1 | 5/2006 | Hotelling et al. |
| 2006/0114240 A1 | 6/2006 | Lin |
| 2006/0114241 A1 | 6/2006 | Lin |
| 2006/0232600 A1 | 10/2006 | Kimura et al. |
| 2007/0008299 A1 | 1/2007 | Hristov |
| 2007/0222762 A1 | 9/2007 | Van Delden et al. |
| 2007/0229466 A1 | 10/2007 | Peng et al. |
| 2007/0229468 A1 | 10/2007 | Peng et al. |
| 2007/0229469 A1 | 10/2007 | Seguine |
| 2007/0229470 A1 | 10/2007 | Snyder et al. |
| 2007/0242054 A1 | 10/2007 | Chang et al. |
| 2007/0257894 A1 | 11/2007 | Philipp |
| 2007/0262962 A1 | 11/2007 | XiaoPing et al. |
| 2007/0262963 A1 | 11/2007 | Xiao-Ping et al. |
| 2007/0268265 A1 | 11/2007 | XiaoPing |
| 2007/0273659 A1 | 11/2007 | XiaoPing et al. |
| 2007/0273660 A1 | 11/2007 | XiaoPing |
| 2007/0279395 A1 | 12/2007 | Philipp et al. |
| 2007/0291009 A1 | 12/2007 | Wright et al. |
| 2008/0006453 A1 | 1/2008 | Hotelling |
| 2008/0007534 A1 | 1/2008 | Peng et al. |
| 2008/0062140 A1 | 3/2008 | Hotelling et al. |
| 2008/0062147 A1 | 3/2008 | Hotelling et al. |
| 2008/0074398 A1 | 3/2008 | Wright |
| 2008/0111795 A1 | 5/2008 | Bollinger |
| 2008/0117182 A1 | 5/2008 | Um et al. |
| 2008/0150906 A1 | 6/2008 | Grivna |
| 2008/0158172 A1 | 7/2008 | Hotelling et al. |
| 2008/0158181 A1 | 7/2008 | Hamblin et al. |
| 2008/0164076 A1 | 7/2008 | Orsley |
| 2008/0218488 A1 | 9/2008 | Yang et al. |
| 2008/0245582 A1 | 10/2008 | Bytheway |
| 2008/0246723 A1 | 10/2008 | Baumbach |
| 2008/0259044 A1 | 10/2008 | Utsunomiya et al. |
| 2008/0264699 A1 | 10/2008 | Chang et al. |
| 2008/0265914 A1 | 10/2008 | Matsushima |
| 2008/0297176 A1 | 12/2008 | Douglas |
| 2008/0308323 A1 | 12/2008 | Huang et al. |
| 2008/0309635 A1 | 12/2008 | Matsuo |

(56) References Cited

U.S. PATENT DOCUMENTS

| | | |
|---|---|---|
| 2009/0002337 A1 | 1/2009 | Chang |
| 2009/0002338 A1 | 1/2009 | Kinoshita et al. |
| 2009/0040191 A1 | 2/2009 | Tong et al. |
| 2009/0046077 A1 | 2/2009 | Tanaka et al. |
| 2009/0091551 A1 | 4/2009 | Hotelling et al. |
| 2009/0096757 A1 | 4/2009 | Hotelling et al. |
| 2009/0107737 A1 | 4/2009 | Reynolds et al. |
| 2009/0128518 A1 | 5/2009 | Kinoshita et al. |
| 2009/0135151 A1 | 5/2009 | Sun |
| 2009/0153509 A1 | 6/2009 | Jiang et al. |
| 2009/0160682 A1 | 6/2009 | Bolender et al. |
| 2009/0185100 A1 | 7/2009 | Matsuhira et al. |
| 2009/0194344 A1 | 8/2009 | Harley et al. |
| 2009/0201267 A1 | 8/2009 | Akimoto et al. |
| 2009/0207154 A1 | 8/2009 | Chino |
| 2009/0213082 A1 | 8/2009 | Ku |
| 2009/0213534 A1 | 8/2009 | Sakai |
| 2009/0236151 A1 | 9/2009 | Yeh et al. |
| 2009/0262096 A1 | 10/2009 | Teramoto |
| 2009/0267916 A1 | 10/2009 | Hotelling |
| 2009/0273571 A1 | 11/2009 | Bowens |
| 2009/0273573 A1 | 11/2009 | Hotelling |
| 2009/0277695 A1 | 11/2009 | Liu et al. |
| 2009/0283340 A1 | 11/2009 | Liu et al. |
| 2009/0303203 A1 | 12/2009 | Yilmaz et al. |
| 2009/0309850 A1 | 12/2009 | Yang |
| 2009/0314621 A1 | 12/2009 | Hotelling |
| 2009/0324621 A1 | 12/2009 | Senter et al. |
| 2010/0001966 A1 | 1/2010 | Lii et al. |
| 2010/0001973 A1 | 1/2010 | Hotelling et al. |
| 2010/0006347 A1 | 1/2010 | Yang |
| 2010/0013745 A1 | 1/2010 | Kim et al. |
| 2010/0013800 A1 | 1/2010 | Elias et al. |
| 2010/0044122 A1 | 2/2010 | Sleeman et al. |
| 2010/0090979 A1 | 4/2010 | Bae |
| 2010/0134422 A1 | 6/2010 | Borras |
| 2010/0140359 A1 | 6/2010 | Hamm et al. |
| 2010/0144391 A1 | 6/2010 | Chang et al. |
| 2010/0147600 A1 | 6/2010 | Orsley |
| 2010/0149108 A1 | 6/2010 | Hotelling et al. |
| 2010/0156839 A1 | 6/2010 | Ellis |
| 2010/0163394 A1 | 7/2010 | Tang et al. |
| 2010/0182273 A1 | 7/2010 | Noguchi et al. |
| 2010/0188359 A1 | 7/2010 | Lee |
| 2010/0193257 A1 | 8/2010 | Hotelling et al. |
| 2010/0194695 A1 | 8/2010 | Hotelling et al. |
| 2010/0194697 A1 | 8/2010 | Hotelling et al. |
| 2010/0214247 A1 | 8/2010 | Tang et al. |
| 2010/0220075 A1 | 9/2010 | Kuo et al. |
| 2010/0253646 A1 | 10/2010 | Hiratsuka |
| 2010/0258360 A1 | 10/2010 | Yilmaz |
| 2010/0265210 A1 | 10/2010 | Nakanishi et al. |
| 2010/0271330 A1 | 10/2010 | Philipp |
| 2010/0277433 A1 | 11/2010 | Lee et al. |
| 2010/0289770 A1 | 11/2010 | Lee et al. |
| 2010/0291973 A1 | 11/2010 | Nakahara et al. |
| 2010/0302201 A1 | 12/2010 | Ritter et al. |
| 2010/0321043 A1 | 12/2010 | Philipp et al. |
| 2010/0321326 A1 | 12/2010 | Grunthaner et al. |
| 2011/0007030 A1 | 1/2011 | Mo et al. |
| 2011/0018841 A1 | 1/2011 | Hristov |
| 2011/0022351 A1 | 1/2011 | Philipp et al. |
| 2011/0025635 A1 | 2/2011 | Lee |
| 2011/0025639 A1 | 2/2011 | Trend et al. |
| 2011/0048812 A1 | 3/2011 | Yilmaz |
| 2011/0048813 A1 | 3/2011 | Yilmaz |
| 2011/0057887 A1 | 3/2011 | Lin et al. |
| 2011/0062969 A1 | 3/2011 | Hargreaves et al. |
| 2011/0062971 A1 | 3/2011 | Badaye |
| 2011/0063251 A1 | 3/2011 | Geaghan et al. |
| 2011/0080357 A1 | 4/2011 | Park et al. |
| 2011/0090159 A1 | 4/2011 | Kurashima |
| 2011/0096016 A1 | 4/2011 | Yilmaz |
| 2011/0109579 A1 | 5/2011 | Wang et al. |
| 2011/0109590 A1 | 5/2011 | Park |
| 2011/0141051 A1 | 6/2011 | Ryu |
| 2011/0169770 A1 | 7/2011 | Mishina et al. |
| 2011/0187666 A1 | 8/2011 | Min |
| 2011/0242444 A1 | 10/2011 | Song |
| 2011/0248949 A1 | 10/2011 | Chang et al. |
| 2011/0267300 A1 | 11/2011 | Serban et al. |
| 2011/0273391 A1 | 11/2011 | Bae |
| 2011/0298746 A1 | 12/2011 | Hotelling |
| 2012/0038585 A1 | 2/2012 | Kim |
| 2012/0044171 A1 | 2/2012 | Lee et al. |
| 2012/0050216 A1 | 3/2012 | Kremin et al. |
| 2012/0056820 A1 | 3/2012 | Corbridge |
| 2012/0162133 A1 | 6/2012 | Chen et al. |
| 2012/0218199 A1 | 8/2012 | Kim et al. |
| 2012/0313901 A1 | 12/2012 | Monson |
| 2013/0057507 A1 | 3/2013 | Shin et al. |
| 2013/0088372 A1 | 4/2013 | Lundstrum et al. |
| 2013/0162570 A1 | 6/2013 | Shin et al. |
| 2013/0215075 A1 | 8/2013 | Lee et al. |
| 2013/0271422 A1* | 10/2013 | Hotelling ............... G06F 3/044 345/174 |
| 2013/0307820 A1 | 11/2013 | Kim |
| 2013/0314343 A1 | 11/2013 | Cho et al. |
| 2014/0103941 A1 | 4/2014 | Chou et al. |
| 2014/0218339 A1 | 8/2014 | Hotelling et al. |
| 2015/0015537 A1* | 1/2015 | Riedijk ................... G06F 3/044 345/174 |

FOREIGN PATENT DOCUMENTS

| | | |
|---|---|---|
| EP | 0810540 A2 | 12/1997 |
| EP | 0919945 A2 | 6/1999 |
| EP | 0977159 A1 | 2/2000 |
| JP | 2002-215330 A | 8/2002 |
| JP | 2002-268768 A | 9/2002 |
| JP | 2002268786 A | 9/2002 |
| JP | 2011002947 A | 1/2011 |
| JP | 2011002948 A | 1/2011 |
| JP | 2011002949 A | 1/2011 |
| JP | 2011002950 A | 1/2011 |
| JP | 2011004076 A | 1/2011 |
| JP | 2011100379 A | 5/2011 |
| KR | 10110118065 | 1/2012 |
| WO | WO-86/06551 A1 | 11/1986 |
| WO | WO-0057344 A1 | 9/2000 |
| WO | WO-2010117946 A2 | 10/2010 |
| WO | WO-20100136932 A1 | 12/2010 |

OTHER PUBLICATIONS

Quantum Research Group. "Qmatrix Technology White Paper", 2006. 4 Pages.

Lubart, et al. "One Layer Optically Transparent Keyboard for Input Display", IP.com. Mar. 1, 1979. 3 Pages.

Gary L. Barrett et al. "Projected Capacitive Touch Screens", iTouchInternational. 9 pages.

Quantum Research Application Note An-KD01, "Qmatrix Panel Design Guidelines", Oct. 10, 2002. 4 Pages.

Calvin Wang et al. "Single Side All-Point-Addressable Clear Glass Substrate Sensor Design", IP.com. Apr. 2, 2009. 3 Pages.

Tsz-Kin Ho et al. "32.3: Simple Single-Layer Multi-Touch Projected Capacitive Touch Panel", SID 09 Digest.

Johannes Schoning et al. "Multi-Touch Surfaces: A Technical Guide", Technical Report TUM-I0833. 2008.

Shawn Day. "Low Cost Touch Sensor on the Underside of a Casing", IP.com. Oct. 14, 2004.

Ken Gilleo. "The Circuit Centennial", 16 Pages, Apr. 28, 2003.

Ken Gilleo, "The Definitive History of the Printed Circuit", 1999 PC Fab.

Hal Philipp. "Charge Transfer Sensing", vol. 19, No. 2. 1999. pp. 96-105.

Paul Leopardi, "A Partition of the Unit Sphere into Regions of Equal Area and Small Diameter", 2005.

Olivier Bau, "TeslaTouch: Electrovibration for Touch Surfaces", 2010.

(56) References Cited

OTHER PUBLICATIONS

Colin Holland. "SID: Single Layer Technology Boosts Capacitive Touchscreens", www.eetimes.com/General. 2011.
"Novel Single Layer Touchscreen Based on Indium", 2011.
"Mesh Patterns for Capacitive Touch or Proximity Sensors", IP.com. May 14, 2010. 3pages.
"IDT Claims World's First True Single-Layer Multi-Touch Projected Capacitive Touch Screen Technology", EE Times Europe. Dec. 8, 2010.
Tracy V. Wilson et al. "How the iPhone Works", HowStuffWorks "Multi-touch Systems". 2011.
Sunkook Kim et al. "A Highly Sensitive Capacitive Touch Sensor Integrated on a Thin-Film-Encapsulated Active-Matrix OLED for Ultrathin Displays", IEEE Transactions on Electron Devices, vol. 58, No. 10, Oct. 2011.
Mike Williams, "Dream Screens from Graphene", Technology Developed at Rice could Revolutionize Touch-Screen Displays. Aug. 2011.
ASIC Packaging Guidebook, Toshiba Corporation. (2000). 35 pages.
Fujitsu Microelectronics Limited. "IC Package." (2002). 10 pages.

\* cited by examiner

MODULATION SCHEME FOR FINGERPRINT SENSING

BACKGROUND

Field

Embodiments of the present invention generally relate to fingerprint sensors, and more specifically, to modulating reference voltages to perform capacitive sensing.

Background of the Invention

Input devices including proximity sensor devices (also commonly called touchpads or touch sensor devices) are widely used in a variety of electronic systems. Input devices may also include fingerprint sensors and other biometric sensor devices. A sensor device typically includes a sensing region, often demarked by a surface, in which the sensor device determines the presence, location, motion, and/or features of one or more input objects. Sensor devices may be used to provide interfaces for the electronic system. For example, sensor devices are often used as input devices for larger computing systems (such as opaque touchpads and fingerprint sensors integrated in, or peripheral to, notebook or desktop computers). Sensor devices are also often used in smaller computing systems (such as touch screens integrated in cellular phones).

BRIEF SUMMARY OF THE INVENTION

One embodiment described herein includes a processing system that includes a fingerprint sensor that includes a plurality of sensor electrodes and a plurality of receivers coupled to the sensor electrodes. The processing system also includes a reference voltage rail configured to power the fingerprint sensor, where the receivers are configured to acquire resulting signals from the sensor electrodes for capacitive sensing while the reference voltage rail is modulated.

Another embodiment described herein includes an input device that includes a fingerprint sensor that includes a plurality of sensor electrodes and a plurality of receivers coupled to the sensor electrodes. The input device also includes a reference voltage rail configured to power the fingerprint sensor, where the receivers are configured to acquire resulting signals from the sensor electrodes for capacitive sensing while the reference voltage rail is modulated. The input device also includes a chassis containing the fingerprint sensor, where the reference voltage rail is modulated relative to a chassis ground.

Another embodiment described herein is a method that includes modulating a reference voltage rail used to provide power to a fingerprint sensor and acquiring, while modulating the reference voltage rail, resulting signals from a plurality of sensor electrodes at a plurality of receivers for performing capacitive sensing, where the sensor electrodes are disposed in the fingerprint sensor.

BRIEF DESCRIPTION OF DRAWINGS

So that the manner in which the above recited features of the present invention can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the disclosure or its application and uses. Furthermore, there is no intention to be bound by any expressed or implied theory presented in the preceding technical field, background, brief summary or the following detailed description.

Various embodiments of the present invention provide a fingerprint sensor that derives a fingerprint by measuring capacitive sensing signals while modulating a reference voltage rail used to power the fingerprint sensor. In one embodiment, the fingerprint sensor is integrated into an electronic device which may include other components such as a display, I/O devices, speakers, and the like. To power these components (including the fingerprint sensor), the electronic device may include a DC power supply which outputs reference voltages. The electronic device may include various power supplies that convert the DC reference voltages into various voltages used to power the components in the electronic device. When transmitting the reference voltages to the fingerprint sensor, the electronic device may modulate the voltages using a modulation signal (e.g., a square or sine wave). Because the reference voltages are used to power the components in the fingerprint sensor, modulating the rail voltages also causes the components coupled to the rail voltage (either directly or indirectly) to also modulate. While this modulation occurs, the fingerprint sensor measures resulting signals using a plurality of sensor electrodes. Based on these resulting signals, the fingerprint sensor can derive a fingerprint of a user.

In one embodiment, the fingerprint sensor may be embodied in an integrated circuit (i.e., a semiconductor chip) that is isolated from the remaining components in the electronic device so that modulating the reference voltages does not have a negative impact on the other portions of the electronic device. In one example, the reference voltages in the fingerprint sensor are coupled to the DC power source ohmically (i.e., directly), capacitively, or inductively. Using coupling circuitry, the electronic device can isolate the fingerprint sensor from the DC power source and prevent the modulating reference voltages in the fingerprint sensor from negatively affecting the other components in the electronic device.

Figure 1:
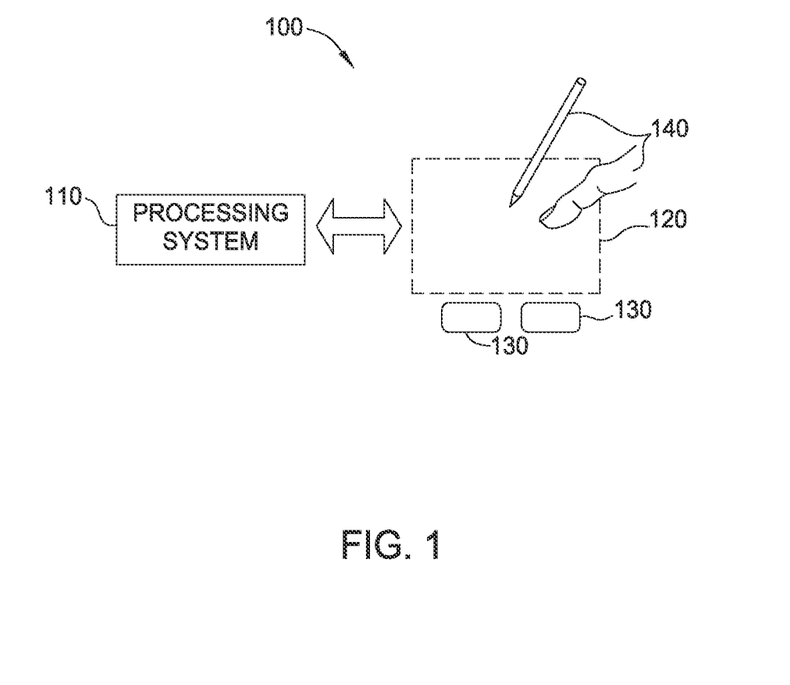
FIG. 1 is a block diagram of an exemplary system that includes an input device in accordance with embodiments of the invention.

Turning now to the figures, FIG. 1 is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I²C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1. In one embodiment, the input device 100 is a fingerprint sensor that senses the different features in a finger such as ridges and valleys which can be used to form a fingerprint. The fingerprint sensor may be a swipe sensor, where a fingerprint image is reconstructed from a series of scans as the user moves their finger over the sensor, or a placement sensor, where a sufficient area of the fingerprint can be captured from a single scan as the user holds her finger at a fixed location in the sensing region 120.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100. In another embodiment, the sensing region 120 has a circular shape that conforms to the shape of a fingertip.

The input device 100 may utilize any combination of sensor components and sensing technologies to detect user input in the sensing region 120. The input device 100 comprises one or more sensing elements for detecting user input.

Some implementations are configured to provide images that span one, two, three, or higher dimensional spaces. Some implementations are configured to provide projections of input along particular axes or planes.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include deriving a fingerprint, changing operation modes (e.g., a low power state to an active power state), as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 (which may include sensors for detecting a fingerprint) overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
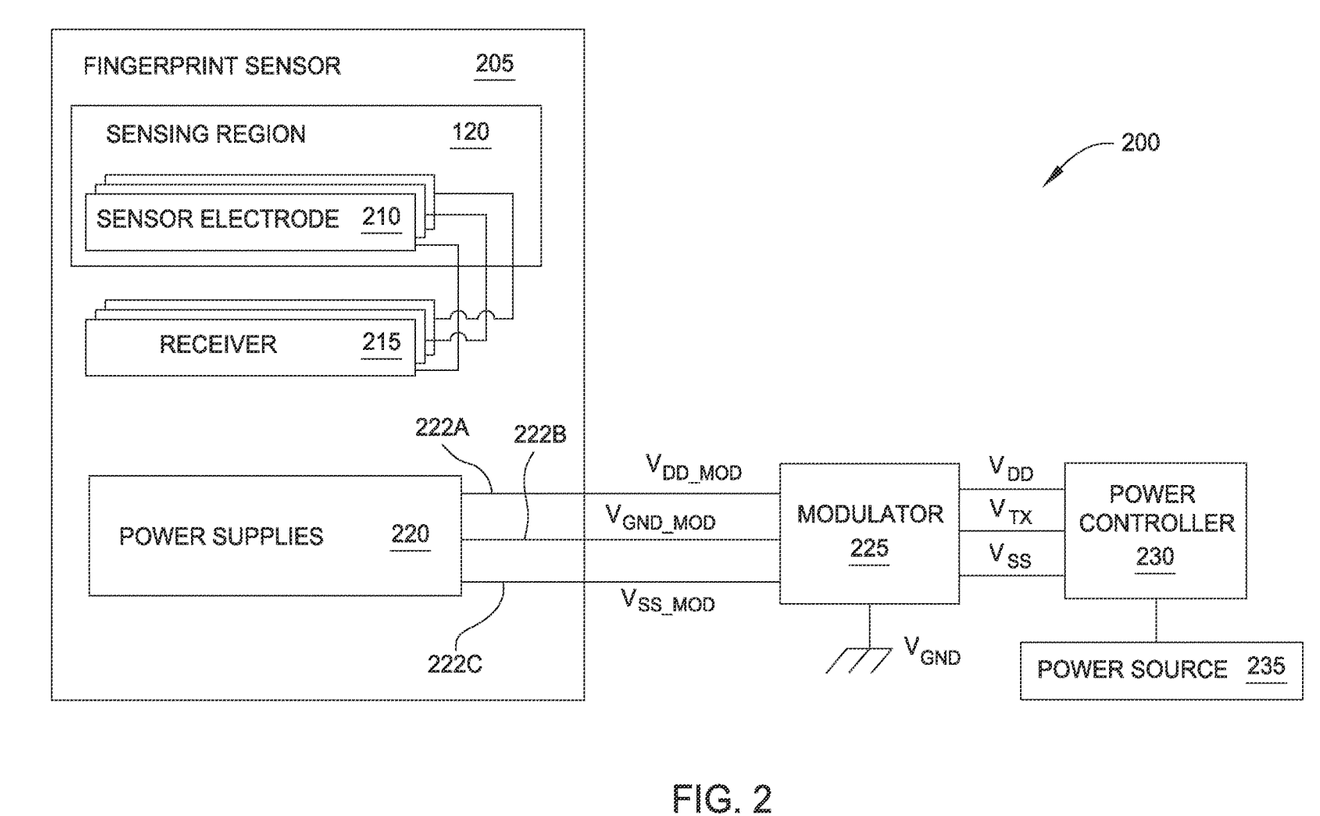
FIG. 2 is an input device with a fingerprint sensor in accordance with embodiments of the invention.

FIG. 2 is an input device 200 with a fingerprint sensor 205 in accordance with embodiments of the invention. As shown, the input device 200 includes the fingerprint sensor 205, a modulator 225, power controller 230, and power source 235. The fingerprint sensor 205 includes sensing region 120 which includes a plurality of sensor electrodes 210 coupled to respective receivers 215. In one embodiment, each of the sensor electrodes 210 is coupled to a respective one of the receivers 215 in a one-to-one relationship. However, in other embodiments, one of the receivers 215 may be selectively coupled to multiple sensor electrodes 210 using a selector circuit such as a multiplexer. For example, when performing capacitive sensing, during a first time period a receiver may acquire a resulting signal from a first one of the sensor electrodes 210 but acquire a resulting signal from a second one of the sensor electrodes 210 during a second, non-overlapping time period.

Regardless of how sensor electrodes 210 and receivers 215 are coupled, the receivers 215 derive a capacitive sensing measurement from the resulting signals that can then be used to derive a fingerprint. In one embodiment, the receivers 215 may transmit their individual capacitive sensing measurements to logic (not shown) that is either located on the fingerprint sensor 205 or external to the sensor 205 which then derives the fingerprint.

The fingerprint sensor 205 includes power supplies 220 for powering the various components in the sensor 205—e.g., the receivers 215. For example, the power supplies 220 may isolate different sections of the sensors to reduce noise/interference or provide high voltages to only a section of the fingerprint sensor 205. The power supplies 220 receive power using reference voltage rails 222. The power supplies 220 may convert the voltages on the rails 222 to a specific voltage that is required to power the components in the fingerprint sensor 205. For example, the receivers 215 may require a different voltage than other powered components in the sensor 205. The power supplies 220 can convert the voltages provided by the reference voltage rails 222 to the specific voltages required by the powered components in the sensor 205. To generate the various voltages, the power supplies 220 may be switched power supplies that use inductive boost circuits or charge pumps to change the voltages provided by the reference voltage rails 222. In one embodiment, however, the fingerprint sensor 205 may not need different voltages and instead the components in the sensor 205 are directly coupled to the reference voltage rails 222.

In this embodiment, the voltages on the reference voltage rails 222 are modulated using the modulator 225 which is coupled to the power controller 230. As shown, the power controller 230 (e.g., a power management integrated circuit (PMIC)) provides reference voltages $V_{DD}$ and $V_{SS}$ to the modulator 225 which may be DC (i.e., constant) voltages. For example, the power controller 230 is in turn coupled to a power source 235—e.g., a battery or a converter—that provides DC power to the power controller 230. Using the power provided by the power source 235, the power controller 230 outputs the DC reference voltages $V_{DD}$ and $V_{SS}$ to the modulator 225. In addition, the power controller 230 generates a modulating signal $V_{TX}$ which the modulator 225 uses to modulate the DC reference voltages $V_{DD}$ and $V_{SS}$. The modulator 225 drives modulated reference voltages $V_{DD\_MOD}$, $V_{SS\_MOD}$, and $V_{GND\_MOD}$ on the reference voltage rails 222.

In one embodiment, the modulating signal $V_{TX}$ is any periodic signal (e.g., a square wave or sine wave) or non-periodic signal that changes voltages relative to chassis ground $V_{GND}$ of the input device 200. As described in more detail below, the modulator 225 may use the voltage swing in the modulating signal $V_{TX}$ to change the voltages on the reference voltage rails 222A and 222C—i.e., voltages $V_{DD\_MOD}$ and $V_{SS\_MOD}$. In one example, the modulator 225 changes the voltage on the reference voltage rails 222A and 222C in a similar manner such that the voltage difference between the voltage rails 222A and 222C remains constant. However, in other embodiments, the modulator 225 may modulate the voltages on only one of the reference voltage rails 222 while the voltage on the remaining rail (or rails) remains substantially constant.

By modulating the reference voltage rails 222, any component in the fingerprint sensor coupled either directly or indirectly to the voltage rails 222 is also modulated. For example, because the receivers 215 may be coupled to the voltage rails 222 either directly or indirectly via the power supplies 220, the receivers 215 are also modulated. Because all the powered components in the fingerprint sensor 205 are being modulated relative to the chassis ground $V_{GND}$, from the perspective of the sensor 205 it appears as if the rest of the world is modulating. Thus, if a finger is placed on the sensing region 120, to the perspective of the fingerprint sensor 205, the voltage on the finger modulates. Conversely, from the perspective of the finger or the remaining components in the input device 200 (which is coupled to earth ground or chassis ground), it appears as if the entire fingerprint sensor 205 is modulating.

When a finger is capacitively coupled to the fingerprint sensor 205 (i.e., a finger is proximate to the sensing region 120), by measuring resulting signals using the sensor electrodes 210 and receivers 215, the input device 200 can measure the capacitance between the sensor 205 and the finger. By measuring the capacitance at the locations of the sensor electrodes 210 (which are disposed at different locations in the sensing region 120), the input device 200 can identify the features of the finger such as a ridge or valley. By combining the local capacitance measurements generated by the receivers 215, the input device 200 can derive a fingerprint.

In one embodiment, the input device 200 may use large voltages to generate the resulting signals and derive a fingerprint. That is, the input device 200 may use a modulating signal that swings tens, hundreds, or thousands of volts. Such a large voltage swing may require more expensive and/or bulky circuitry than if the input device 200 used a modulation signal that swings only a few volts. Advantageously, only the modulator 225 in the input device 200 needs to generate these large voltage swings when driving the reference voltages $V_{DD\_MOD}$ and $V_{SS\_MOD}$ onto the rails 222. Conversely, if the input device 200 instead used individual transmitters to drive the modulating signal onto transmitter electrodes in the sensing region 120, each of these transmitters would need to include circuitry that could drive a signal that modulates tens or hundreds of volts which may increases the cost or size of the sensor relative to fingerprint sensor 205 which has only one transmitter (i.e., modulator 225).

Figure 3:
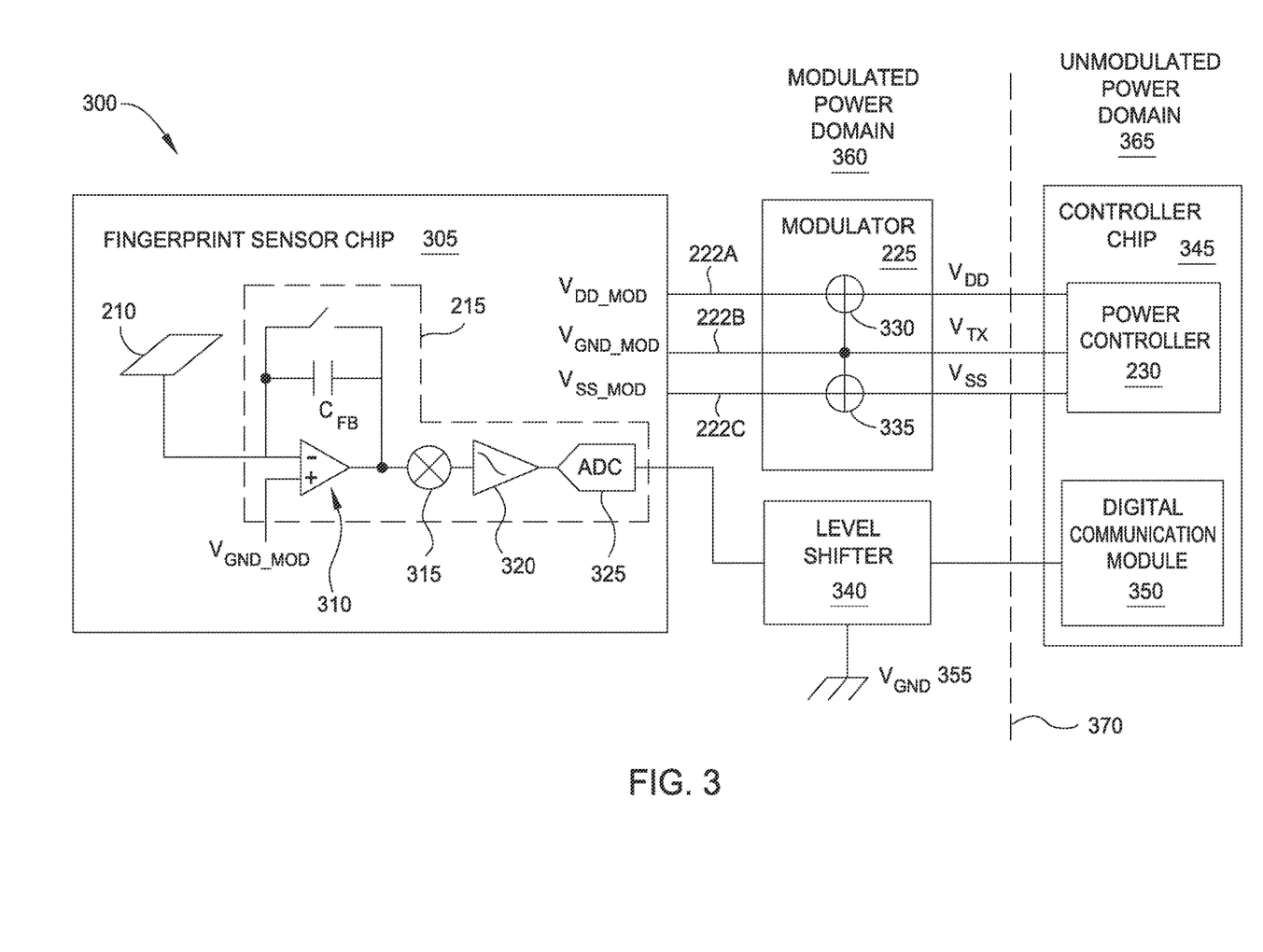
FIG. 3 is an input device with a fingerprint sensor chip in accordance with embodiments of the invention.

FIG. 3 is an input device 300 with a fingerprint sensor chip 305 in accordance with embodiments of the invention. In addition to the fingerprint sensor chip 305, the input device 300 includes modulator 225, a level shifter 340, and a controller chip 345. In one embodiment, the fingerprint sensor chip 305 is a separate semiconductor chip than the controller chip 345. The modulator 225 and the level shifter 340 may be located on the fingerprint sensor chip 305, the controller chip 345, or on separate integrated circuits.

In one embodiment, the controller chip 345 is not ohmically (or directly) coupled to the fingerprint sensor chip 305. Instead, the fingerprint sensor chip 305 may be inductively, capacitively, optically, or acoustically coupled to the controller chip 345 and/or the modulator 225 in order to receive the modulated reference voltages VDD_MOD, VSS_MOD, and VGND_MOD. In another embodiment, the fingerprint sensor chip 305 may be selectively coupled to the modulator 225 and/or the controller chip 345. For example, during time periods when the reference voltage rails 222 are not being modulated, the fingerprint sensor chip 305 may be ohmically coupled to the power controller 230. However, when modulating the voltage rails 222, the input device 300 may electrically decouple the fingerprint sensor chip from the controller chip 345.

For ease of explanation, only one sensor electrode 210 and receiver 215 are illustrated in the fingerprint sensor chip 305. However, the fingerprint sensor chip 305 may include multiple sensor electrodes 210 each coupled to a respective receiver 215. The receiver 215 includes an integrator 310, demodulator 315, low pass filter 320 and analog-to-digital converter 325 (ADC). Modulating the reference voltage rails 222 generates resulting signals on the sensor electrode 210 which are then acquired by the receiver 215 at an input port of an amplifier in the integrator 310. As shown, the amplifier also includes a second input coupled to a local ground for the fingerprint sensor chip 305 (i.e., $V_{GND\_MOD}$) which is being modulated relative to the chassis ground $V_{GND}$ 355 of the input device 300. Specifically, the power controller 230 transmits the modulating signal $V_{TX}$ to the modulator 225 which then modulates the DC reference voltages $V_{DD}$ and $V_{SS}$ using the adder circuits 330 and 335 using the modulation signal $V_{TX}$. In this embodiment, the modulating signal $V_{TX}$ is assigned as the local ground $V_{GND\_MOD}$ for the fingerprint sensor chip 305.

In operation, because the local ground $V_{GND\_MOD}$ is modulated relative to the chassis ground $V_{GND}$ and earth ground (to which an input object such as a finger is typically coupled), the integrator 310 measures the amount of charge needed in order to drive the modulating voltage $V_{GND\_MOD}$ onto the sensor electrode 210. Using the feedback capacitor $C_{FB}$, demodulator 315, low pass filter 320, and ADC 325, the receiver 215 processes this charge to determine a local capacitive sensing measurement corresponding to a location of the sensing region proximate to the sensor electrode 210. This capacitive sensing measurement changes depending on the feature of the finger that is currently disposed over the sensor electrode 210 in the sensing region. For example, the local capacitive sensing measurement may change depending on whether a ridge or a valley of a fingertip is disposed over the sensor electrode 210. By determining capacitive sensing measurements from a plurality of sensor electrode and receiver pairs in the fingerprint sensor chip 305, the input device 300 can generate a fingerprint. Moreover, in one embodiment, multiple receivers 215 may acquire resulting signals from respective sensor electrodes 210 simultaneously. Put differently, each receiver 215 in the fingerprint sensor chip 305 may acquire resulting signals in parallel with the other receivers 215 without affecting their measurements. However, this is not a requirement and the receivers 215 can acquire the resulting signals at different times.

Although FIG. 3 illustrates using a low input impedance charge amplifier to determine the capacitive sensing measurements, in other embodiment, the fingerprint sensor chip 305 may use a high input impedance amplifier and a low input impedance current amplifier to derive the capacitive measurements. For example, the chip 305 may include a current to voltage converter or a current conveyor.

As discussed above, the modulator 225 includes adder circuits 330 and 335 which modulate the DC reference voltage $V_{DD}$ and $V_{SS}$ using the modulating signal $V_{TX}$. For example, if $V_{DD}$ is 4V and $V_{SS}$ is -1V, the modulation signal $V_{TX}$ may add a 1V voltage swing on both rails such that the voltage $V_{DD\_MOD}$ on voltage rail 222A changes between 5 and 3V, while the voltage $V_{SS\_MOD}$ on voltage rail 222C changes between 0 and -2V. Nonetheless, the voltage difference between the rails 222A and 222C remains the same (i.e., 4V). However, in another embodiment, the reference voltage modulator 225 may modulate only one of the voltage rails 222. For example, reference voltage rail 222A may remain constant (e.g., 4V) while reference voltage rail 222C is modulated (e.g., between 0 and -2V).

The level shifter 340 facilitates digital communication between the fingerprint sensor chip 305 and a digital communication module 350 in controller chip 345. As illustrated by dotted line 370, the fingerprint sensor chip 305 is in a modulated power domain 360 while the controller chip 345 is in an unmodulated power domain 365. Because the reference voltages in domain 360 are being modulated, it may be impossible to directly couple the output of the ADC 325 to the digital communication module 350. Instead, the level shifter 340 performs a voltage conversion so that the fingerprint sensor chip 305 and controller chip 345 can share data. Although shown in this example as digital data (e.g., the local capacitive measurement) being transmitted from the ADC 325 to the digital communication module 350, the reverse may also be true. For example, the digital communication module 350 may transmit configuration data to the fingerprint sensor chip 305 which is converted by the level shifter 340 into voltages suitable for the modulated power domain 360 before being relayed to the fingerprint sensor chip 305. Although the level shifter 340 and modulator 225 are shown in the modulated power domain 360, they may be considered as being in both domains 360, 365 since these components send and receive voltages in both domains.

In other embodiments, digital communication between components in the modulated and unmodulated power domains 360, 365 may be obtained without using the level shifter 340. In one example, the fingerprint sensor chip 305 and the controller chip 345 may use differential signals to communicate, in which case, the fact the two chips are in different power domains does not matter. For example, the fingerprint sensor chip 305 and the controller chip 345 may both include receivers capable of receiving the differential signal plus the additional voltage swing added by modulating the reference voltage rails. Moreover, the receivers may use common mode rejection to extract the signals. In another example, the fingerprint sensor chip 305 may communicate with the controller chip 345 only when the reference voltage rails 222 are not being modulated. If the fingerprint sensor chip 305 waits until the voltage rails 222 are held at a constant or DC voltage, then essentially the fingerprint sensor chip 305 is no longer in the modulated power domain 360 but is in the unmodulated power domain 365. Thus, by selectively modulating the reference voltage rails 222, the input device 300 can establish communication periods where the digital data generated by the receivers 215 is transmitted to the digital communication module 350. For example, the fingerprint sensor chip 305 may include a buffer memory that stores the output of the ADC 325 so that the output can be transmitted to the digital communication module 350 when the reference voltage rails 222 are not being modulated.

In one embodiment, the fingerprint sensor is not located on a separate chip 305. In a single chip embodiment, the fingerprint sensor may be located on the controller chip 345 but the power supplies on the fingerprint sensor may be isolated from the power supplies in the power controller 230 using inductive or capacitive switching. If in a low-power state (described below), some of the power supplies in the fingerprint sensor may be unpowered during modulation.

Furthermore, in the signal chip embodiment, the chip may still include level shifters to permit the fingerprint sensor to communicate with the unmodulated components in the chip while the reference voltages in the fingerprint sensor are modulated.

Figure 4:
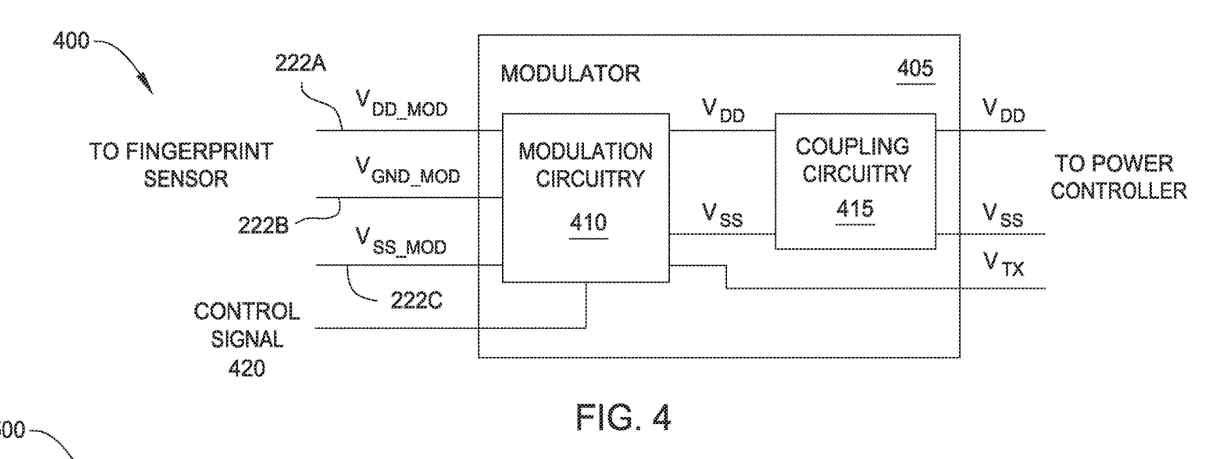
FIG. 4 is a modulator in an input device for modulating reference voltage rails in a fingerprint sensor in accordance with embodiments of the invention.

FIG. 4 is a modulator 405 in an input device 400 for modulating reference voltage rails in a fingerprint sensor in accordance with embodiments of the invention. The modulator 405 includes modulation circuitry 410 and coupling circuitry 415. As shown, the coupling circuitry 415 receives the DC reference voltages from, e.g., the power controller. In one embodiment, the coupling circuitry 415 may include a transformer that inductively couples the reference voltages $V_{DD}$ and $V_{SS}$ to the modulation circuitry 410. Alternatively, the coupling circuitry 415 may include a switched capacitor network that selectively connects and disconnects a capacitor to the power controller. When the capacitor is connected, the power controller charges the capacitor, but when disconnected, the charge stored on the capacitor is used to maintain the reference voltages $V_{DD}$ and $V_{SS}$ provided to the modulation circuitry 410. Generally, the coupling circuitry 415 can be any kind of circuitry that isolates the unmodulated reference voltages $V_{DD}$ and $V_{SS}$ from the modulated reference voltages $V_{DD\_MOD}$ and $V_{SS\_MOD}$. Stated differently, the coupling circuitry 415 may serve as an interface between the unmodulated and modulated power domains 360, 365 illustrated in FIG. 3.

The modulation circuitry 410 may include the adder circuits 330 and 335 illustrated in FIG. 3 or any other type of circuitry capable of generating modulated reference voltages $V_{DD\_MOD}$ and $V_{SS\_MOD}$ from unmodulated reference voltages $V_{DD}$ and $V_{SS}$. In this example, the modulation circuitry 410 receives a control signal 420 as an input which selectively activates and deactivates the modulation circuitry 410. For example, the fingerprint sensor may use the control signal 420 to stop modulating the reference voltage rails 222, in which case, the voltage rails 222 are driven to DC values—i.e., $V_{DD}$ and $V_{SS}$. The fingerprint sensor may wish to do so in order to perform capacitive sensing at a particular sensor electrode rather than modulating the entire fingerprint sensor, or to communicate with a chip in the unmodulated power domain.

Figure 5:
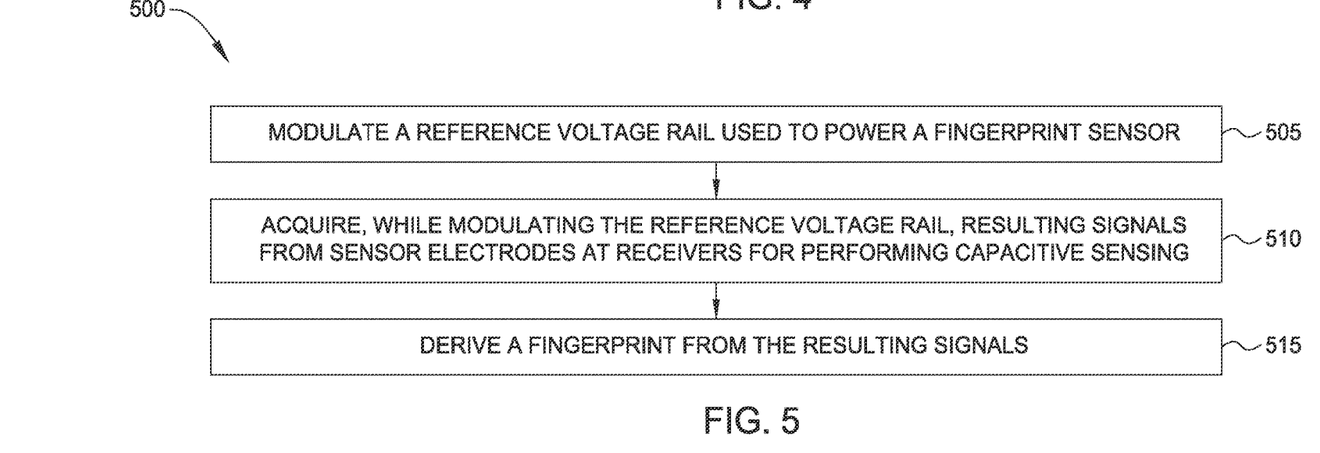
FIG. 5 is a flow chart for deriving a fingerprint using a modulated reference voltage in accordance with embodiments of the invention.

FIG. 5 is a flow chart 500 for deriving a fingerprint using a modulated reference voltage in accordance with embodiments of the invention. At block 505, the input device modulates at least one reference voltage rail used to power the fingerprint sensor. In one embodiment, the reference voltage rail is modulated relative to chassis or earth ground. Thus, to the perspective of the fingerprint sensor, the other components in the input device and the objects in the surrounding environment are modulating. Put differently, the local ground for the fingerprint sensor modulates relative to the chassis ground of the input device. This modulation may be performed using a square wave, sine wave, or any other periodic or non-periodic signal that changes voltages.

At block 510, receivers in the fingerprint sensor acquire resulting signals from sensor electrodes for performing capacitive sensing while the reference voltage rail is modulated.

At block 515, the input device derives a fingerprint from the resulting signals. In one embodiment, the receivers are coupled to the local ground of the fingerprint sensor which is modulated relative to chassis or earth ground. Using the resulting signals, the receivers measure the charge or current required to modulate any input object (e.g., a user's finger) capacitively coupled to the sensing region of the fingerprint sensor. Based on the charge, the receivers derive local capacitive measurements which can be collected and processed to derive a fingerprint.

Figure 6:
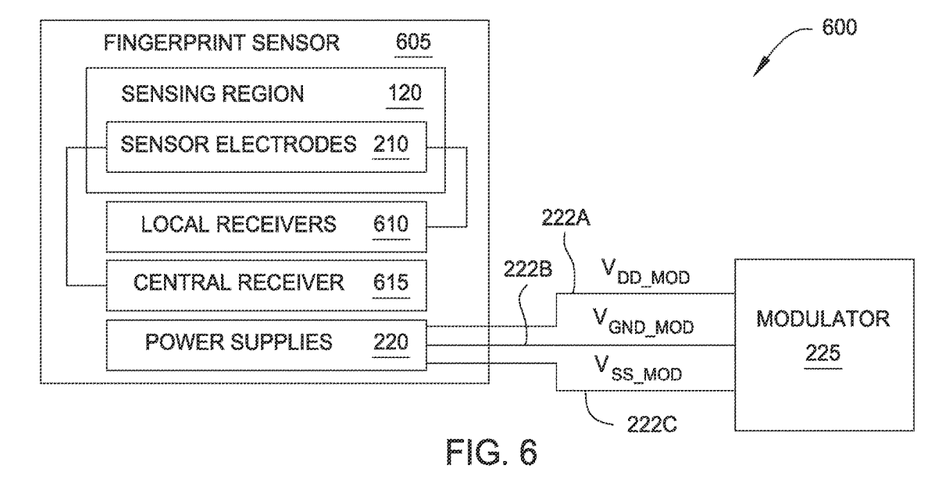
FIG. 6 is an input device with a fingerprint sensor in accordance with embodiments of the invention.

FIG. 6 is an input device 600 with a fingerprint sensor 605 in accordance with embodiments of the invention. Like in FIG. 2, the fingerprint sensor 605 is coupled to a modulator 225 which modulates the reference voltage rails 222 used to power the fingerprint sensor 605. However, unlike in FIG. 2, the fingerprint sensor 605 includes a central receiver 615 which may be directly or indirectly coupled to the sensor electrodes 210. The fingerprint sensor 605 also includes local receivers 610 which are each coupled to only one (or a subset) of the sensor electrodes 210, while the central receiver 615 may be coupled to all of the sensor electrodes 210.

While the reference voltage rails 222 are modulated, the central receiver 615 can acquire resulting signals from the sensor electrodes 210 simultaneously. Stated differently, the central receiver 615 may acquire a resulting signal that represents the combined total of the resulting signals provided by the sensor electrodes 210. By receiving resulting signals from all the sensor electrodes 210, the central receiver 615 determines a general capacitive measurement for the sensing region in the fingerprint sensor. Essentially, this general capacitive measurement treats the entire sensing region of the fingerprint sensor 605 as a single capacitive pixel or button. By evaluating the general capacitive measurements generated by the central receiver 615 the input device 600 can determine if an input object is contacting the fingerprint sensor 605 or hovering over the fingerprint sensor 605, although the input device 600 may be unable to identify a particular location of the input object within the sensing region. In contrast, because the local receivers 610 are coupled to individual sensor electrodes 210 (or a subset of the sensor electrodes 210) rather than all the sensor electrodes 210, the local capacitive measurements generated by the local receivers 610 can be used to derive a particular feature of the user's finger at a particular location in the sensing region.

Although the central receiver 615 may be unable to identify particular features of a finger, the central receiver 615 may be used to determine when to wake up the input device 600 from a low-power state to an active state. For example, in response to a user prompt or a period of inactivity, the input device 600 may switch to the low-power state where various components in the input device 600 are powered off. For example, the local receivers 610 along with the power supplies 220 coupled to these local receivers 610 may be powered down. Moreover, the input device 600 may include a display with an integrated capacitive sensing region which is also powered down. When powered down, the display may no longer display an image and the integrated sensing region may be unable to detect an input object. However, the central receiver 615 (and a power supply 220 that provides power to the central receiver 615) remains operational. Thus, as the modulator 225 modulates the reference voltage rails 222, the central receiver 615 continues to acquire resulting signals from the sensor electrodes 210 and determine general capacitive sensing measurements. In one embodiment, the modulator 225 may continuously modulate the reference voltage rails 222 so that the central receiver 615 can derive the general capacitive sensing measurements. In another embodiment, the modulator 225 may modulate the voltage rails 222 intermittently (e.g., at pre-defined intervals). When not modulating the voltage rails 222, the modulator 225 and central receiver 615 may be powered down.

By monitoring the general capacitive measurements derived by the central receiver 615 in the low-power state, the input device 600 may determine when to switch to the active state. For example, when a user moves his finger towards the fingerprint sensor 605, the general capacitive measurements derived by the central receiver 615 begin to change. By identifying this change, the input device 600 can determine that a user's finger is approaching and switch to the active state. In one embodiment, the input device 600 is able to detect that the finger even when the finger is still a few centimeters away from the fingerprint sensor 605. Thus, before the finger reaches the fingerprint sensor 605, the input device 600 can begin to wake up the various components in the device. For example, the input device 600 may activate the local receivers 610 so that they begin to generate the local capacitive sensing measurements. As such, the user simply needs to move his finger proximate to the sensing region 120 (i.e., does not need to activate a button) to activate the fingerprint sensor 605. Once the fingerprint sensor 605 is active, the input device 600 can determine whether the derived fingerprint matches the fingerprint of an authorized user. If so, the input device 600 can activate the remaining components in the input device 600 such as the display and/or the integrated touch sensing region.

Advantageously, by coupling the central receiver 615 to most, if not all, of the sensor electrodes 210, the input device 600 can use the sensing region of the fingerprint sensor 605 as a large capacitive pixel that can detect an approaching input object. Thus, the input device 600 is able to wake up faster (i.e., activate the fingerprint sensor 605 such that it can derive a fingerprint) than a device that relies on the user to press a button to activate the fingerprint sensor 605. Moreover, only the central receiver 615 needs to be activated to detect the approaching finger rather than all the local receivers 610 which means these local receivers 610 can be powered off, thereby saving power.

Figure 7:
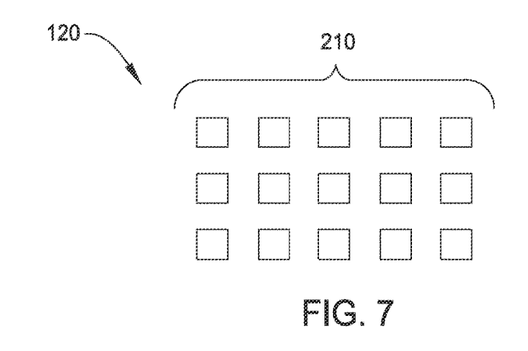
FIG. 7 is an exemplary electrode layout in a fingerprint sensor in accordance with embodiments of the invention.

FIG. 7 is an exemplary electrode, layout in a fingerprint sensor in accordance with embodiments of the invention. FIG. 7 shows a portion of an example sensor electrode pattern comprising sensor electrodes 210 configured to sense in a sensing region 120 associated with the pattern, according to some embodiments. For clarity of illustration and description, FIG. 7 shows a pattern of simple rectangles, and does not show various components.

In one example, the sensor electrodes 210 are disposed on the same side or surface of a common substrate and are isolated from each other in the sensing region 120. The sensor electrodes 210 may be disposed in a matrix array where each sensor electrode may be referred to as a matrix sensor electrode. Each sensor electrode 210 in the matrix array may have a substantially similar size and/or shape. In one embodiment, one or more of sensor electrodes 210 of the matrix array may vary in at least one of size and shape. Each sensor electrode 210 of the matrix array may correspond to a pixel of a capacitive image (also referred to as a capacitive pixel). Further, two or more sensor electrodes 210 of the matrix array may correspond to a pixel of a capacitive image. In various embodiments, each sensor electrode 210 of the matrix array may be coupled a separate capacitive routing trace of a plurality of capacitive routing traces.

In various embodiments, the sensor electrodes 210 comprises one or more gird electrodes disposed between at least two sensor electrodes of sensor electrodes 210. The grid electrode and at least one sensor electrode may be disposed on a common side of a substrate, different sides of a common substrate and/or on different substrates. In one or more embodiments, the sensor electrodes 210 the grid electrode(s) may encompass an entire voltage electrode of a display device. For example, the sensor electrodes 210 may be integrated with a display on the display device. Although the sensor electrodes 210 may be electrically isolated on the substrate, the electrodes may be coupled together outside of the sensing region—e.g., in a connection region. In one embodiment, a floating electrode may be disposed between the grid electrode and the sensor electrodes 210. In one particular embodiment, the floating electrode, the grid electrode and the sensor electrode 210 comprise the entirety of a common electrode of a display device.

In one embodiment, the sensor electrodes 210 may include transmitter electrodes which modulate relative to a reference voltage (e.g., local or chassis ground) to transmit transmitter signals and receiver electrodes for facilitating receipt of resulting signals caused the by transmitter signals. In one embodiment, the transmitter and receiver electrodes may have different shapes/sizes. In other embodiments, the transmitter and receiver electrodes may have a similar size and/or shape. Thus, the size and/or shape of the one or more of the sensor electrodes 210 may be different than the size and/or shape of another one or more of the sensor electrodes 210. Nonetheless, each of the sensor electrodes 210 may be formed into any desired shape on their respective substrates. The width and length of the sensor electrodes 210 may range from 15 to 100 microns with a density of 300-1000 dots per inch in the sensor.

In another embodiment, the sensor electrodes 210 may be arranged using linear arrays or square-grid arrays that are not connects as a matrix. In any of the sensor electrode arrangements described above, the sensor electrodes 210 may be operated by the input device 100 for transcapacitive sensing by dividing the sensor electrodes 210 into transmitter and receiver electrodes or for absolute capacitive sensing, or some mixture of both. Further, one or more of the sensor electrodes 210 may be used to perform shielding.

Thus, the embodiments and examples set forth herein were presented in order to best explain the embodiments in accordance with the present technology and its particular application and to thereby enable those skilled in the art to make and use the present technology. However, those skilled in the art will recognize that the foregoing description and examples have been presented for the purposes of illustration and example only. The description as set forth is not intended to be exhaustive or to limit the disclosure to the precise form disclosed.

In view of the foregoing, the scope of the present disclosure is determined by the claims that follow.

We claim:

1. A processing system, comprising:
   a fingerprint sensor, comprising:
   a plurality of sensor electrodes,
   a plurality of receivers coupled to the sensor electrodes,
   a DC power source, and
   a modulator; and
   a reference voltage rail configured to power the fingerprint sensor, wherein the receivers are configured to acquire resulting signals from the sensor electrodes for capacitive sensing while the reference voltage rail is modulated by the modulator,
   wherein the DC power source is coupled to the reference voltage rail,
   wherein the modulator includes modulation circuitry and coupling circuitry, the coupling circuitry comprising a switched capacitor network configured to selectively connect and disconnect a capacitor to the DC power source, wherein when the capacitor is connected to the DC power source, the DC power source charges the capacitor, and when disconnected from the DC power source, charge stored on the capacitor maintains a reference voltage provided to the modulation circuitry.

2. The processing system of claim 1, wherein the reference voltage rail comprises a modulated power supply voltage.

3. The processing system of claim 2, further comprising:
a power controller chip separate from the fingerprint sensor, wherein the power controller chip is configured to provide a constant power supply voltage that is modulated to generate the reference voltage rail.

4. The processing system of claim 1, wherein the receivers each comprise an amplifier with a first input coupled to a local ground of the fingerprint sensor and a second input coupled to a respective one of the sensor electrodes.

5. The processing system of claim 1, further comprising:
a level shifter configured to facilitate digital communication between the fingerprint sensor and an integrated circuit, wherein the fingerprint sensor and the integrated circuit are in different voltage domains.

6. The processing system of claim 1, wherein the fingerprint sensor further comprises:
a central receiver coupled with each of the sensor electrodes, wherein the central receiver is configured to simultaneously receive resulting signals from the sensor electrodes while the reference voltage rail is modulated.

7. The processing system of claim 6, wherein the fingerprint sensor is configured to transmit an alert to switch from a low power state to an active state based on processing the simultaneously received resulting signals.

8. The processing system of claim 1, wherein the plurality of sensor electrodes are formed in an integrated circuit.

9. The processing system of claim 1, wherein the modulator is configured to modulate the reference voltage rail after the reference voltage rail is disconnected from the DC power source.

10. An input device, comprising:
a DC power source
a fingerprint sensor comprising:
a plurality of sensor electrodes,
a plurality of receivers coupled to the sensor electrodes, and
a modulator;
a reference voltage rail configured to power the fingerprint sensor, wherein the receivers are configured to acquire resulting signals from the sensor electrodes for capacitive sensing while the reference voltage rail is modulated by the modulator, and wherein the DC power source is coupled to the reference voltage rail; and
a chassis containing the fingerprint sensor, wherein the reference voltage rail is modulated relative to a chassis ground by the modulator,
wherein the modulator includes modulation circuitry and coupling circuitry, the coupling circuitry comprising a switched capacitor network configured to selectively connect and disconnect a capacitor to the DC power source, wherein when the capacitor is connected to the DC power source, the DC power source charges the capacitor, and when disconnected from the DC power source, charge stored on the capacitor maintains a reference voltage provided to the modulation circuitry.

11. The input device of claim 10, further comprising:
a power controller chip separate from the fingerprint sensor, wherein the power controller chip is configured to provide a constant power supply voltage that is modulated relative to the chassis ground to generate the reference voltage rail.

12. The input device of claim 10, wherein the receivers each comprise an amplifier with a first input coupled to a local ground of the fingerprint sensor and a second input coupled to a respective one of the sensor electrodes.

13. The input device of claim 10, a level shifter configured to facilitate digital communication between the fingerprint sensor and an integrated circuit, wherein the fingerprint sensor and the integrated circuit are in different voltage domains.

14. The input device of claim 10, wherein the fingerprint sensor further comprises:
a central receiver coupled with each of the sensor electrodes, the central receiver is configured to simultaneously receive resulting signals from the sensor electrodes while the reference voltage rail is modulated.

15. The input device of claim 14, wherein the fingerprint sensor is configured to transmit an alert to switch from a low power state to an active state upon detecting a presence of an input object using the simultaneously received resulting signals.

16. The input device of claim 10, wherein the reference voltage rail is modulated after the reference voltage rail is disconnected from the DC power source.

17. A method comprising:
connecting a capacitor in a switched capacitor network to a DC power source to charge the capacitor;
disconnecting the capacitor from the DC power source, wherein charge stored on the capacitor maintains reference voltages provided to modulation circuitry in a modulator when the capacitor is disconnected from the DC power source;
modulating, using the modulation circuitry, a reference voltage rail used to provide power to a fingerprint sensor; and
acquiring, while modulating the reference voltage rail, first resulting signals from a plurality of sensor electrodes at a plurality of receivers for performing capacitive sensing, wherein the sensor electrodes are disposed in the fingerprint sensor.

18. The method of claim 17, wherein modulating the reference voltage rail further comprises:
modulating a DC power supply output voltage relative to a chassis ground of a chassis containing the fingerprint sensor.

19. The method of claim 17, further comprising:
deriving a digital capacitive measurement signal based on the first resulting signals;
level shifting the digital capacitive measurement signal; and
transmitting the level shifted signal to an integrated circuit, wherein the integrated circuit is in a different voltage domain than the fingerprint sensor.

20. The method of claim 17, further comprising:
configuring the fingerprint sensor in a low power state;
simultaneously measuring, while modulating the reference voltage rail, second resulting signals from the sensor electrodes using a central receiver coupled with the sensor electrodes; and
transmitting an alert to switch from the low power state to an active state based on processing the second resulting signals.

21. The method of claim 17, further comprising:
electrically disconnecting the reference voltage rail from a DC power supply before modulating the reference voltage rail.

* * * * *